US007290036B2

(12) United States Patent
Cao et al.

(10) Patent No.: US 7,290,036 B2
(45) Date of Patent: Oct. 30, 2007

(54) ELECTRONIC MAIL PRIORITY ALERT SERVICE VIA TELEPHONE

(75) Inventors: Qinghong Cao, Allentown, PA (US); Liang Jin, Allentown, PA (US); Wenzhe Luo, Allentown, PA (US); Jian Wu, Macungie, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 402 days.

(21) Appl. No.: 10/806,313

(22) Filed: Mar. 23, 2004

(65) Prior Publication Data

US 2004/0181587 A1    Sep. 16, 2004

Related U.S. Application Data

(62) Division of application No. 09/441,077, filed on Nov. 16, 1999, now Pat. No. 6,745,230.

(51) Int. Cl.
*G06F 15/16* (2006.01)
*H04M 1/64* (2006.01)

(52) U.S. Cl. .................................... 709/207; 709/206

(58) Field of Classification Search ........ 709/206–207, 709/224
See application file for complete search history.

(56) References Cited

U.S. PATENT DOCUMENTS

| 5,260,986 | A |  | 11/1993 | Pershan |  |
|---|---|---|---|---|---|
| 5,796,394 | A |  | 8/1998 | Wicks |  |
| 5,944,786 | A |  | 8/1999 | Quinn |  |
| 5,956,521 | A |  | 9/1999 | Wang |  |
| 6,035,104 | A |  | 3/2000 | Zahariev |  |
| 6,147,977 | A | * | 11/2000 | Thro et al. | 370/265 |
| 6,212,265 | B1 |  | 4/2001 | Duphorne |  |
| 6,317,485 | B1 |  | 11/2001 | Homan |  |
| 6,335,963 | B1 |  | 1/2002 | Bosco |  |
| 6,400,810 | B1 | * | 6/2002 | Skladman et al. | 379/93.24 |
| 6,434,222 | B1 |  | 8/2002 | Shaffer |  |
| 6,442,589 | B1 |  | 8/2002 | Tkahashi |  |
| 6,556,666 | B1 |  | 4/2003 | Beyda |  |
| 6,633,630 | B1 | * | 10/2003 | Owens et al. | 379/93.24 |

FOREIGN PATENT DOCUMENTS

WO    WO98/37680 A2  *  8/1998

* cited by examiner

*Primary Examiner*—Patrice Winder

(57) ABSTRACT

The present invention relates to a new feature for e-mail services which provides a telephone call alert to a particular e-mail user when their e-mail server, web page e-mail server, or other e-mail receiving server receives new e-mail addressed to them. One or more designated telephone number (or numbers) are automatically called by an auto dialer at the e-mail server in response to the receipt of particularly identified high priority e-mail senders (e.g., from clients, from family, etc.). The particular designated telephone number(s) to call for a particular user are configured in a priority alert profile for that particular user, as are the possibility to limit the activation of the telephone call alert system to electronic messages received only from a select list of senders, and/or after a predetermined number of electronic messages have been received, and/or if a current time corresponds to a predetermined time to alert a recipient.

6 Claims, 6 Drawing Sheets

*FIG. 3*

Group: @ abcdefg.com  ← 201

| USER | TELEPHONE #1 | TELEPHONE #2 | VIP #1 | VIP #2 |
|---|---|---|---|---|
| bill | 610-555-1212 | 610-555-1213 | irs | clinton@whitehouse.gov |
| barb | 610-555-1213 | 610-555-0001 | abc@aol.com | uspto.gov |
| ted | 610-555-1000 | — | unclesam@uspto.gov | |
| alice | 610-555-1212 | — | gore@whitehouse.gov | |

302 → bill
304 → barb
306 → ted
308 → alice

○
○
○

ELECTRONIC MAIL PRIORITY ALERT SERVICE VIA TELEPHONE

This application is a divisional application of application Ser. No. 09/441,077, filed Nov. 16, 1999, now U.S. Pat. No. 6,745,230, the entirety of which is explicitly incorporated herein by reference.

BACKGROUND OF THE INVENTION

1. Field of the Invention

This invention relates generally to electronic messaging. More particularly, it relates to an improved notification of received electronic mail to a user.

2. Background of Related Art

Electronic messaging (e.g., e-mail) has become a mainstay in today's world. While paper mail services (commonly referred to in the electronic messaging world as "snail mail") continue to serve useful purposes, electronic mail services (commonly referred to as "e-mail") has become an indispensable part of communication in today's society.

Various architectures exist for providing e-mail services. For instance, the two most common e-mail system architectures either employ an e-mail server in communication with the Internet, or a web page on the Internet providing access to a group of e-mail users.

An e-mail server has an Internet Protocol (IP) address, and is connected to the Internet. The e-mail server processes electronic messages (e.g., e-mail) for a particular group of users, and parses out the group addressed mail to individual account users, providing services for sending and for receiving e-mail.

When new mail is received addressed to a particular group of users, a conventional e-mail server typically assembles a list of new messages for a user to retrieve the next time that they log on to their individual user account on the e-mail server. Thus, a user is alerted to the receipt of a new e-mail message once properly logged on to the e-mail server.

For example, in a Unix system, the e-mail server provides a textual message to the addressed user in the group indicating "you have new mail . . . " or a similar message upon receipt of at least one newly received e-mail message. As another example, AMERICA ONLINE™ Internet service includes a proprietary mail server which audibly announces "You've got mail" upon receipt of at least one new incoming e-mail message. However, the textual and/or audible announcements regarding new e-mail are limited to receipt by a logged on e-mail user currently accessing the e-mail server.

A web page based e-mail server operates somewhat similarly to a more traditional e-mail server with respect to the individual users. In particular, using a web page based mail server, a web page is established for each user. Each user accesses and logs on to their individual e-mail web page access using a suitable web browser such as NETSCAPE NAVIGATOR™ or MICROSOFT EXPLORER™. Using their web browser, a user accesses their e-mail web page, provides the appropriate password information, and then reviews their incoming mailbox to determine if they have received any e-mail messages. Examples of web based mail servers are hotmail.com™ and Yahoo!mail™.

In any event, a user must have their computer turned on, and conventionally provide an account name and password before being notified of whether or not incoming e-mail has been received. Thus, using either an e-mail server or a web page mail server, a user is notified of a received e-mail message only after they provide the requisite log on information and refresh or re-access the appropriate e-mail service.

Many users do not keep their computer terminal on at all times, or are in transit from one computer terminal to another. Unless a user has their computer terminal powered up and properly logged on to the appropriate e-mail service, conventional e-mail servers and web page e-mail servers do not provide indication to a user about the receipt of e-mail. Moreover, the requirement for the user to input an account name and password (either manually or automatically using an appropriate e-mail program such as MICROSOFT OUTLOOK™ to automatically input the account name and password) each time e-mail is to be checked is cumbersome, and causes delays between the time that the e-mail was actually received and when the user is finally notified of such receipt.

Accordingly, a disadvantage in the current electronic messaging systems (i.e., either traditional mail server or web based mail server) is that the user must power up a computer, log into the computer system and network service, and have an account name and password entered and confirmed into an e-mail server or web page e-mail server, before they are even notified as to whether or not new e-mail messages were received for them. This extensive effort can be burdensome for some users, and in some instances can cause significant delays between when the e-mail was received and when the user is actually notified of such of days and even weeks, particularly for users who receive e-mail infrequently and/or power up their computer infrequently.

There is a need for an improved electronic messaging architecture and technique which provides a more timely notification to users regarding the receipt of e-mail messages, particularly to the casual user of computers and/or e-mail services.

SUMMARY OF THE INVENTION

In accordance with the principles of the present invention, an electronic message alerting module comprises a plurality of priority alert profiles. Each of the plurality of priority alert profiles associate an electronic message user with at least one telephone number. The electronic message alerting module further includes an autodialer adapted to dial the at least one telephone number associated with the electronic message user when an electronic message addressed to the electronic message user is received.

A method of alerting a recipient of an electronic message in accordance with another aspect of the present invention comprises identifying a recipient of a received electronic message. A telephone number for the recipient is determined, and the telephone number for the recipient of the received electronic message is dialed to alert said recipient of said received electronic message.

BRIEF DESCRIPTION OF THE DRAWINGS

Features and advantages of the present invention will become apparent to those skilled in the art from the following description with reference to the drawings, in which:

FIG. 3 shows a detailed example of a group account of priority alert profiles in the priority alert profile database shown in FIGS. 1 and 2.

FIG. 6 depicts a user logged onto the Internet through an Internet Service Provider (ISP) to access either an e-mail server provided by their ISP, an e-mail server in communication with the Internet, or a web page e-mail server.

DETAILED DESCRIPTION OF ILLUSTRATIVE EMBODIMENTS

The present invention relates to a new feature for e-mail services which provides a telephone call alert to a particular e-mail user when their e-mail server, web page e-mail server, or other e-mail receiving server receives new e-mail addressed to them. One or more designated telephone number (or numbers) are automatically called by an auto dialer at the e-mail server in response to the receipt of particularly identified high priority e-mail senders (e.g., from clients, from family, etc.). The particular designated telephone number(s) to call for a particular user are configured in a priority alert profile for that particular user, as are the possibility to limit the activation of the telephone call alert system to electronic messages received only from a select list of senders, and/or after a predetermined number of electronic messages have been received.

Figure 1:
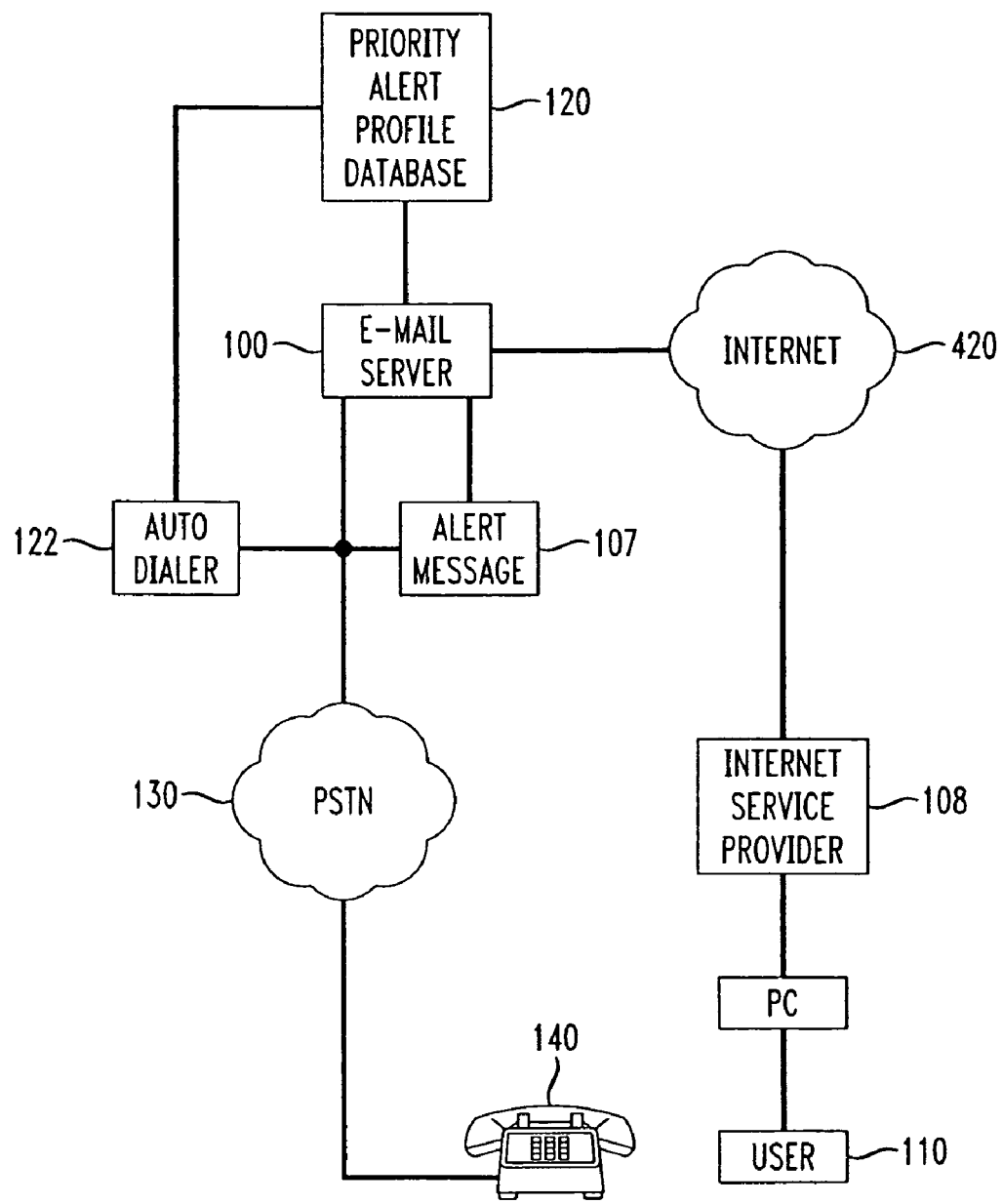
FIG. 1 shows an embodiment of an electronic message alerting system including an e-mail server with associated priority alert profile database and auto-dialer, in accordance with the principles of the present invention.

FIG. 1 shows an embodiment of an electronic message alerting system including an e-mail server with associated priority alert profile database and auto-dialer, in accordance with the principles of the present invention.

In particular, in FIG. 1, an e-mail server 100 provides e-mail services to a user 110 at a computer terminal. The user is also associated with one (or more) telephones 140 to which a priority alert telephone call is automatically dialed by an auto dialer 122 at the e-mail service provider based on any of several exemplary criteria relating to a received e-mail message to that user 110. Such exemplary criteria establishing for whom the user 110 desires a priority alert telephone call may be stored in a priority alert profile for that particular user 110. A plurality of priority alert profiles for a number of users in one or more groups may be assembled into a priority alert profile database 120. The priority alert profile database 120 may be a relational or other type database.

A priority alert profile is established for each e-mail user or account to configure those e-mail senders for a particular user which are to be given automatic telephonic alert to the user upon receipt of their e-mail. Thus, after each user establishes a priority alert profile, matching e-mail causes automatic placement of an auto-dialed telephone number set by the user as a location for receiving a telephone call priority alert.

The telephone call priority alert may be an automated message speaking a phrase such as "You have just received new e-mail. Log onto your e-mail account to receive it.", or similar. Of course, the principles of the present invention relate equally to use of a live operator associated with the e-mail server to assist in the placement and/or conversation in the telephone call priority alert. Moreover, the present invention relates equally to the placement of a telephone call priority alert without an associated voice message. In such a case, the alert can be determined by the called user by a review of received call related information such as Caller ID information associated with the source of the telephone call priority alert (e.g., the e-mail service).

The priority alert profile database 120 lists parameters necessary for determining which (if not all) received e-mail is to cause placement of an automated telephone call priority alert to the recipient, and to what telephone number(s) the telephone call priority alert is to be placed. Upon receipt of e-mail from a priority source as identified by a match to an entry in the user's priority alert profile, the auto dialer 122 associated with the e-mail server 100 (or web page server in the case of a web based e-mail server) dials the telephone numbers in the user's priority alert profile in order to inform the user of the recent receipt of new e-mail.

The telephone call priority alert can be attempted and abandoned if not answered within a predetermined number of rings (e.g., after 6 rings), or can be queued for periodic call-back until successful.

To provide the telephone call priority alert feature, the user must first configure an appropriate priority alert profile. The priority alert profile is associated with the particular user's e-mail account, and preferably includes an indication as to the sender addresses for which priority alert service is to be provided. The sender address indication can indicate "all" relating to priority service for all senders, or can specifically identify a limited set of senders for which the user would prefer to receive an automated telephone call priority alert message upon receipt of e-mail from them.

The user's priority alert profile preferably also includes at least one telephone number at which the user is to be notified. The priority alert profile may include more than one telephone number for contact, in which case any priority as between the different telephone number can be configured. For instance, the auto dialer of the e-mail server may attempt notification at each of the telephone numbers in order until a successful notification has been made (i.e., a person or telephone answering device answers the telephone alert before the configured maximum number of rings).

The maximum number of rings to be attempted for each telephone alert can be configured by the user and stored in the priority alert profile, can be set in the e-mail server on a group basis, or can be set in the e-mail server on a system basis.

In operation, whenever the e-mail server receives an e-mail message addressed to a particular user serviced by that e-mail server, it checks the "priority alert profile" and compares the relevant information regarding the sender (e.g., the sender's e-mail address or name) to those in the priority alert profile. If a match is found, the alert condition is formed, and the e-mail server will attempt to notify the user of the receipt of new e-mail by automatically dialing the telephone number(s) in the user's priority alert profile.

Thus, if an e-mail message is received by the e-mail server for the user 110 and from a sender specifically identified in a priority alert profile for that user 110, they are provided a telephone call alert in accordance with the principles of the present invention. In the given embodiment, a telephone number for a user 110 is dialed and, if successful, a telephone alert message 107 is played to an answering user at their telephone 140.

The user 110 may also designate a specific time at which they prefer to be alerted to the receipt of e-mail messages. For instance, the casual user of e-mail for personal purposes may prefer to receive the priority alert telephone call at a convenient time in the evening after work, e.g., sometime soon after 7:00 pm. In such a case, the priority alert profile for that particular user may instruct the auto dialer 122 to dial the user at or about 7:00 pm that evening. It is preferred in such a scheduled alert system that the user not be alerted to any received e-mail messages that have already been retrieved by the user.

The alert message 107 may be a suitable voice message playback system including a pre-stored message and capable of output to a telephone line between the e-mail server 100 and the public switched telephone network (PSTN) 130.

If a simple ring and terminate call attempt is to serve as notification to the user, than the alert message 107 is not necessary. For instance, a user with call related information display (e.g., CallerID display) can determine the source (and thus meaning) of the call simply by reviewing the CallerID information received after the first ring of the priority alert telephone call attempt.

Figure 2:
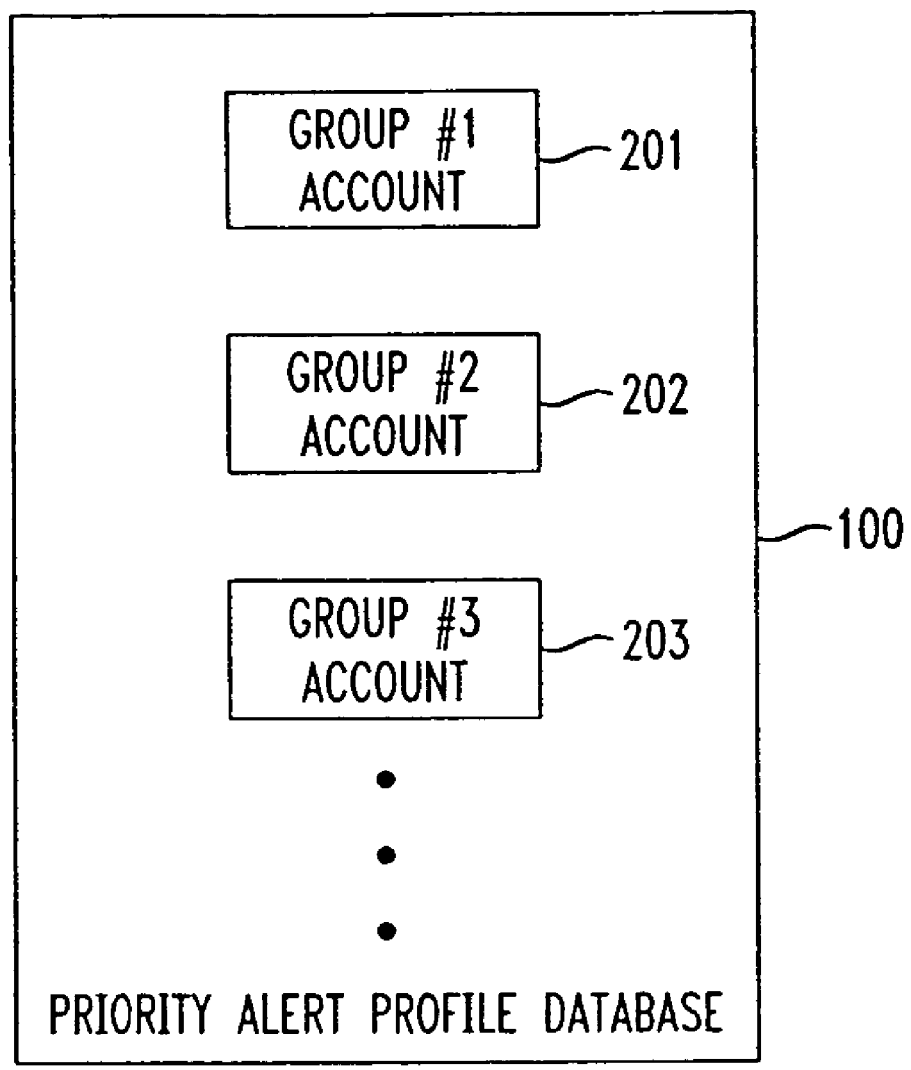
FIG. 2 shows a detailed example of a priority alert profile database shown in FIG. 1 including priority alert profiles for a plurality of groups serviced by the e-mail server or web page e-mail server.

FIG. 2 shows a detailed example of a priority alert profile database 120 shown in FIG. 1 including priority alert profiles for a plurality of groups 201-203 serviced by the e-mail server 100.

In particular, in FIG. 2, a priority alert profile database 120 in accordance with the principles of the present invention may include priority alert profiles for one or more e-mail groups 201-203.

FIG. 3 shows a detailed example of a group account 201 of priority alert profiles in the priority alert profile database 120 shown in FIGS. 1 and 2.

In particular, in FIG. 3, a plurality of priority alert profiles 302, 304, 306 and 308 are established for the users "bill", "barb", "ted" and "alice" within the group "abcdefg.com". In the given example, the specific e-mail addresses of the receiving users for the priority alert profiles 302, 304, 306 and 308 are bill@abcdefg.com, barb@abcdefg.com, ted@abcdefg.com and alice@abcdefg.com, respectively.

In the given example of FIG. 3, the first user "bill" has configured two alternative telephone numbers for receiving his priority alert telephone call notification upon receipt of an e-mail message from either anyone within the group "irs", or form the specific user Clinton@whitehouse.gov. In the preferred embodiment, the telephone numbers will be called in listed order until the auto dialer 122 is successful in establishing a telephone call into which the alert message 107 may be played to the user indicating receipt of new e-mail.

In the example of FIG. 3, the e-mail server 100 will first attempt to alert the user "bill" at the telephone number (610) 555-1212. If unsuccessful at the first telephone number, the user "bill" will then be notified at (610) 555-1213. If neither telephone number results in a successful priority alert notification, then the first telephone number (610) 555-1212 will be re-attempted, e.g., after a 2 minute delay.

In the disclosed embodiment, the priority alert profile for each user will exist in a database on the e-mail server 100 for each user of the e-mail server 100 desiring a priority alert service in accordance with the principles of the present invention. In the preferred embodiment, the priority alert profile can be configured by the user and updated at any time using any suitable technique.

For instance, a web page may be established by the e-mail service allowing the user to view the configuration of their priority alert profile and to make adjustments as desired. Then, when satisfied with the entries in the priority alert profile, the web page can cause an update to the priority alert profile resident on the e-mail server.

Moreover, adjustments to the user's priority alert profile can be automatically made, e.g., based on a pattern of e-mail messages received by a particular user. For instance, a sender who frequently sends messages to the user may be determined by a historical review of recently received e-mail messages, and may be automatically entered into the user's priority alert profile unless removed by the user.

Figure 4:
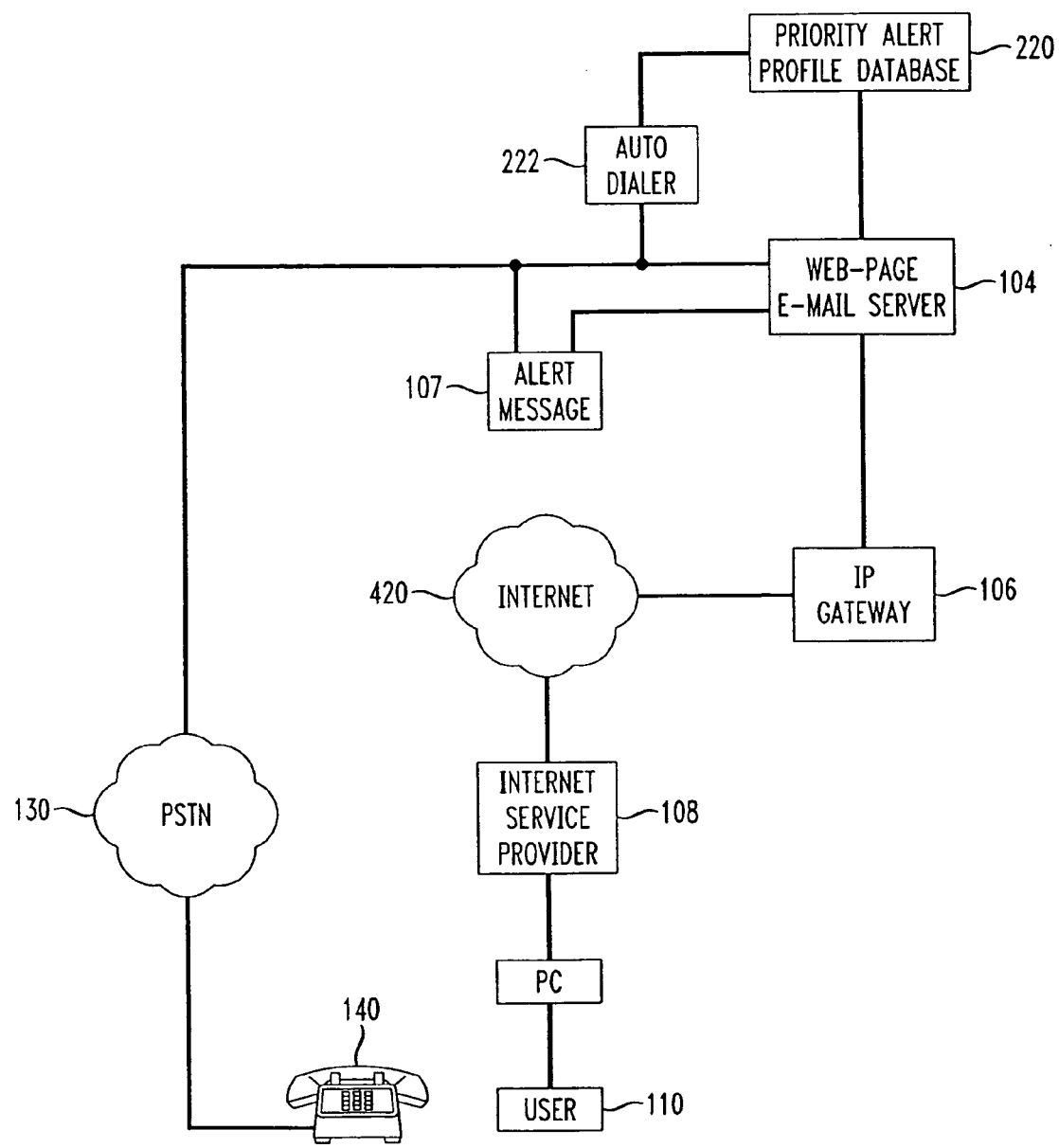
FIG. 4 shows an embodiment of an electronic message alerting system including a web page e-mail server with associated priority alert profile database and auto-dialer, in accordance with the principles of the present invention.

FIG. 4 shows an embodiment of an electronic message alerting system including a web page e-mail server with associated priority alert profile database and auto-dialer, in accordance with the principles of the present invention.

In particular, FIG. 4 shows an implementation of a priority alert telephone call service shown in FIG. 1 in a web page e-mail server system. In the given example architecture, a web page e-mail server 104 gains access to the Internet 420 via a suitable Internet Protocol (IP) gateway 106. A priority alert profile database 220, auto dialer 222, and alert message playback module 107 may be implemented otherwise as shown and described with reference to FIG. 1.

Figure 5:
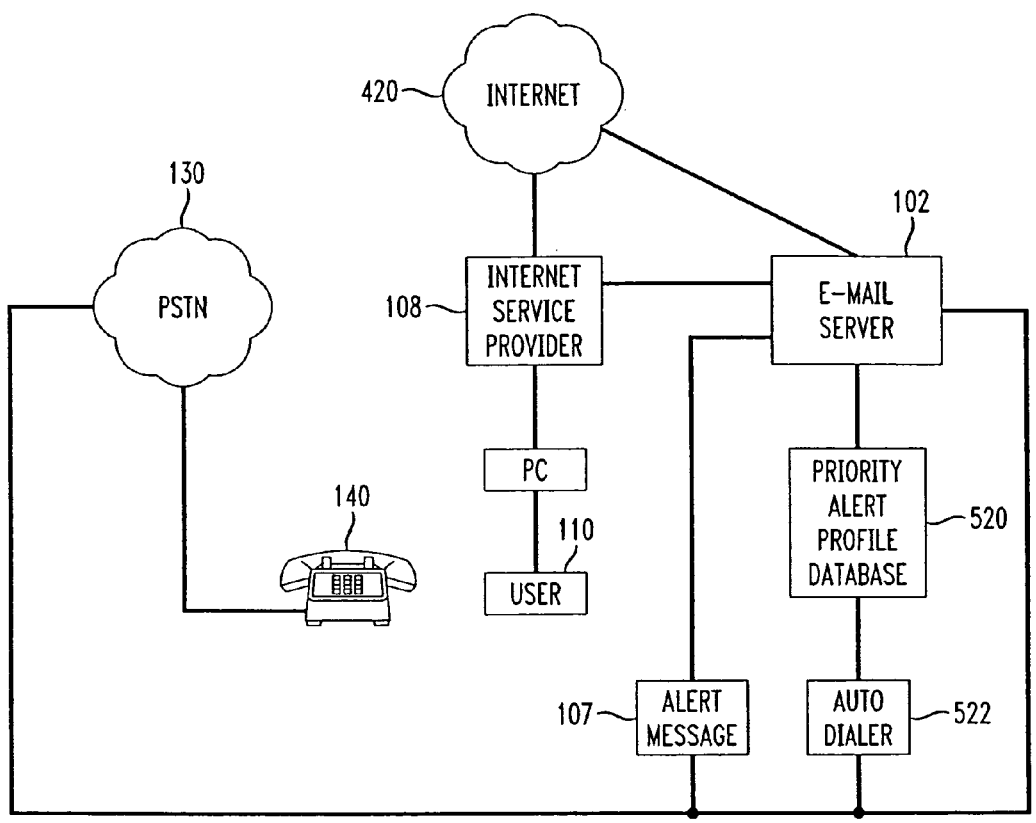
FIG. 5 shows an embodiment of an electronic message alerting system including an Internet Service Provider (ISP) having an e-mail server with associated priority alert profile database and auto-dialer, in accordance with the principles of the present invention.
Figure 6:
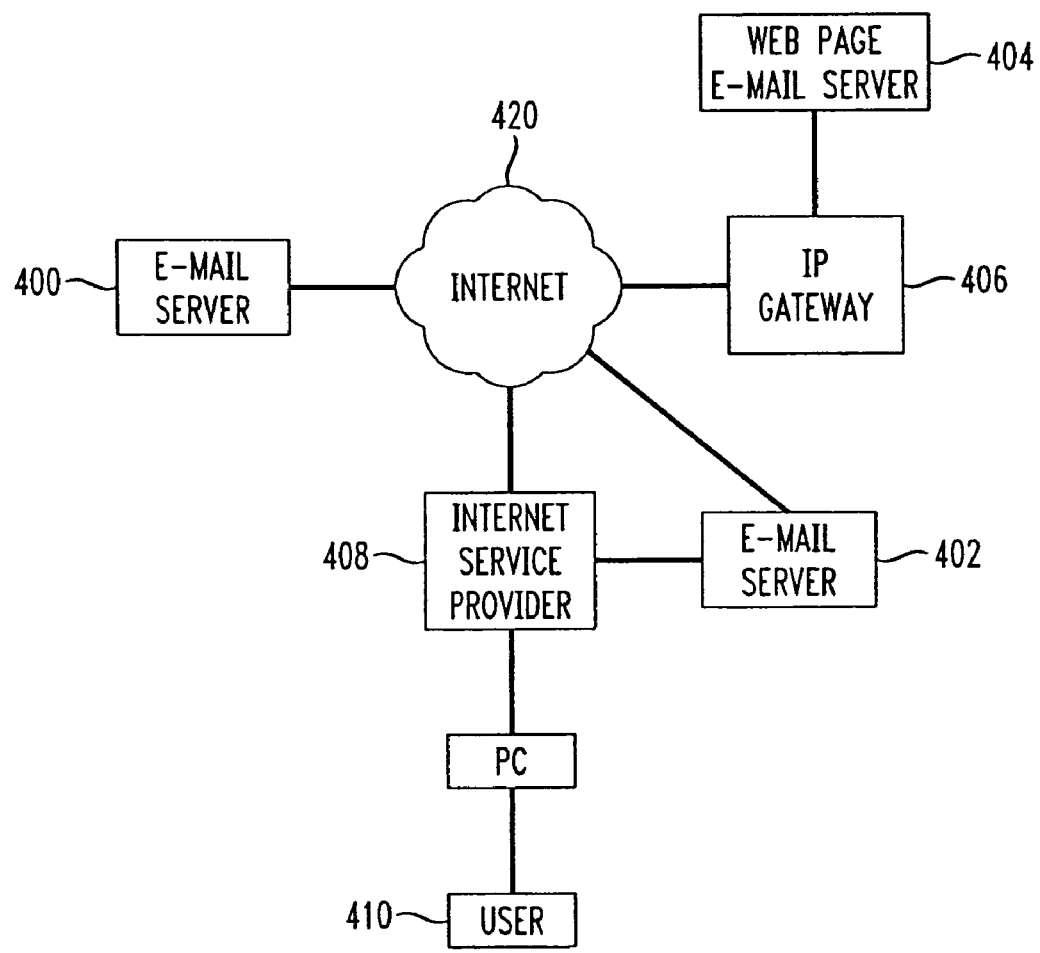
FIG. 6 shows a conventional technique for a user to retrieve information relating to whether or not they have received any new electronic messages.

FIG. 5 shows an embodiment of an electronic message alerting system including an Internet Service Provider (ISP) having an e-mail server with associated priority alert profile database and auto-dialer, in accordance with the principles of the present invention.

FIG. 5 is similar to FIGS. 3 and 4 but for the implementation of the priority alert telephone call through an e-mail server associated with an Internet Service Provider (e.g., AOL™). In FIG. 5, the priority alert profile database 520, auto dialer 522, and alert message playback module 107 are as otherwise shown and described with respect to FIGS. 1 and 4.

The principles of the present invention provide many advantages over conventional e-mail servers. For instance, a user can be notified of the receipt of important or high priority e-mail in a very timely fashion even if their computer terminal is powered down, or merely if they are not logged on to their Internet or e-mail service.

The sender can be identified using information other than (or in addition to) the e-mail address. For instance, the sender may be identified in the priority alert table and compared to a corresponding portion of the received e-mail address using their name, telephone number, or other included information in the e-mail message.

The alerts can be provided to the user on a per-message basis, or can be provided after a predetermined number of e-mail messages have been received. To accomplish this, the priority alert profile database should include a threshold number of e-mail messages beyond which the telephone call alert in accordance with the principles of the present invention can be activated.

While being described with respect to association with an e-mail server or web based e-mail server, the principles of the present invention can be practiced by a third party vendor having access to the Internet and monitoring the user's e-mail account. Of course, in such a case, it is preferred that the e-mail account be monitored on a frequent basis.

While the invention has been described with reference to the exemplary embodiments thereof, those skilled in the art will be able to make various modifications to the described embodiments of the invention without departing from the true spirit and scope of the invention.

What is claimed is:

1. A method of alerting a recipient of an electronic message from a given source, comprising:
   identifying a recipient of a received electronic message;
   identifying a source of said received electronic message;
   comparing a current time to a predefined time at which to alert said recipient by telephone;
   comparing said source of said electronic message to a predefined list of sources for which to alert said recipient by telephone;
   deferring alerting said recipient of said received electronic message until said current time corresponds to said predetermined time at which to alert said recipient; and
   if said source is identified in said predefined list of sources for which to alert said recipient by telephone, dialing a telephone number for said recipient and telephonically alerting said recipient of said received electronic message when said current time corresponds to said predetermined time at which to alert said recipient.

2. The method of alerting a recipient of an electronic message according to claim 1, wherein:
   said electronic message is an e-mail message.

3. Apparatus to alert a recipient of an electronic message from a given source, comprising:
   identifier to identify a recipient of a received electronic message and a source of said received electronic message;
   comparator to compare a current time to a predefined time at which to alert said recipient by telephone;
   comparator to compare said source of said electronic message to a predefined list of sources for which to alert said recipient by telephone;
   processor to defer alerting said recipient of said received electronic message until said current time corresponds to said predetermined time at which to alert said recipient; and
   dialer to dial a telephone number for said recipient and telephonically alerting said recipient of said received electronic message if said source is identified in said predefined list of sources at which to alert said recipient by telephone and if said current time corresponds to said predetermined time for which to alert said recipient.

4. Apparatus to alert a recipient of an electronic message according to claim 3, wherein:
   said electronic message is an e-mail message.

5. Apparatus to alert a recipient of an electronic message from a given source, comprising:
   means for identifying a recipient of a received electronic message and a source of said received electronic message;
   means for comparing a current time to a predefined time at which to alert said recipient by telephone;
   means for comparing said source of said electronic message to a predefined list of sources for which to alert said recipient by telephone;
   means to defer alerting said recipient of said received electronic message until said current time corresponds to said predetermined time at which to alert said recipient; and
   means for dialing a telephone number for said recipient and telephonically alerting said recipient of said received electronic message if said source is identified in said predefined list of sources for which to alert said recipient by telephone and if said current time corresponds to said predetermined time at which to alert said recipient.

6. Apparatus to alert a recipient of an electronic message according to claim 5, wherein:
   said electronic message is an e-mail message.

* * * * *